Dec. 4, 1956 W. J. DUNNET 2,773,134

MAGNETIC AMPLIFIERS

Filed May 25, 1954

WITNESSES

Edwin E. Bassler

K. W. Thomas

INVENTOR

Wallace J. Dunnet

BY

Ezra W. Savage

ATTORNEY

United States Patent Office 2,773,134
Patented Dec. 4, 1956

2,773,134

MAGNETIC AMPLIFIERS

Wallace J. Dunnet, Newtonville, Mass., assignor to Westinghouse Electric Corporation, East Pittsburgh, Pa., a corporation of Pennsylvania Application May 25, 1954, Serial No. 432,134
9 Claims. (Cl. 179—171)

This invention relates to magnetic amplifiers and more particularly, to means for preventing the exciting current from flowing through the load circuit of the magnetic amplifier.

Unless some means is provided for compensating or rendering ineffective the exciting current that flows in a magnetic amplifier, the output voltage of the magnetic amplifier will not be of zero magnitude when the magnetic amplifier is operating at cutoff. However, many applications of magnetic amplifiers require zero output voltage when operating at cutoff. In the past, different types of apparatus have been utilized to annul or compensate for this effect of the exciting current. One such prior art apparatus comprises duplicate reactors, one including the direct-current control winding and the other reactor being a dummy and having a core substantially identical to the core of its associated reactor. The output from these substantially identical reactors is magnetically mixed within a transformer, thus rendering ineffective the exciting current.

Other prior art apparatus for rendering the exciting current ineffective comprises an autotransformer placed in a bridge circuit with the magnetic amplifier. However, both of the above-mentioned prior art means for rendering the exciting current ineffective are not positive methods in obtaining an absolute zero output from the magnetic amplifier since the current from the compensating device seldom matches the phase, magnitude and waveform of the magnetic amplifier exciting current. As a result, an absolute zero output from the magntic amplifier is not obtained. In addition, the use of a substantially identical dummy reactor increases the cost of the overall apparatus.

An object of this invention is to provide for preventing exciting current from flowing in the load circuit of a magnetic amplifier.

Another object of this invention is to provide for preventing exciting current from flowing in the load circuit of a self-saturating magnetic amplifier, by so incorporating a compensating circuit in a self-saturating magnetic circuit that a back-voltage appears across the self-saturating rectifier which is in circuit relationship with the load, while an auxiliary supply voltage drives the magnetic amplifier core to saturation, to thereby obtain substantially zero output from the magnetic amplifier when it is operating at cutoff.

Other objects of this invention will become apparent from the following description when taken in conjunction with the accompanying drawing in which.

Figure 1:
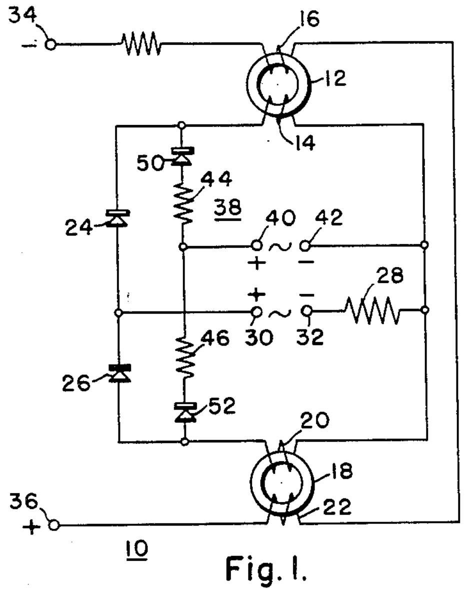
Figure 1 is a schematic diagram of a doubler-type magnetic amplifier illustrating this invention.

Referring to Fig. 1 there is illustrated a full-wave doubler-type magnetic amplifier 10. In general, the magnetic amplifier 10 comprises two half-wave magnetic amplifier circuits. One of these half-wave magnetic amplifier circuits comprises a magnetic core member 12 having disposed in inductive relationship therewith a load winding 14 and a control winding 16. On the other hand, the other half-wave magnetic amplifier circuit comprises a magnetic core member 18 having disposed in inductive relationship therewith a load winding 20 and a control winding 22.

In order to permit the flow of current in only one direction through the load winding 14, to thus produce self-saturation, a self-saturating rectifier 24 is connected in series circuit relationship with the load winding 14. In like manner, in order to permit current to flow in only one direction through the load winding 20, a self-saturating rectifier 26 is connected in series circuit relationship with the load winding 20.

As illustrated, the self-saturating rectifier 24 and the load winding 14 are connected in series circuit relationship with a load 28, this series circuit being connected to be energized by a main alternating-current supply voltage which is applied to terminals 30 and 32. Specifically, the terminal 30 is connected to the junction point of the self-saturating rectifiers 24 and 26, and the terminal 32 is connected to the junction point of the load windings 14 and 20 through the load 28. As illustrated, the load 28 is also connected in series circuit relationship with the load winding 20 and with the self-saturating rectifier 26, this series circuit also being connected to be energized by the main supply voltage.

In order to control, during operation, the magnitude of the voltage across the load 28, the control windings 16 and 22 are rendered responsive to a direct-current control voltage which is applied to control terminals 34 and 36. In particular, the control windings 16 and 22 are connected in series circuit relationship with one another, the series circuit being connected to the terminals 34 and 36. As will be explained more fully hereinafter, the control windings 16 and 22 are so disposed on their respective magnetic core members 12 and 18, and the polarity of the voltage across the control terminals 34 and 36 is such, that the current flow through the control windings 16 and 22 effects a resetting of the flux level in the magnetic core members 12 and 18, respectively. That is, the control winding 16 and the load winding 14 are so wound on the magnetic core member 12 as to be in opposition to one another, and the control winding 22 and the load winding 20 are so wound on the magnetic core member 18 as also to be in opposition to one another.

In accordance with the teachings of this invention, a compensating circuit 38 is provided in order to prevent the flow of exciting current through the load 28. Thus when operating the magnetic amplifier 10 at cutoff, its output is of zero magnitude. In general, the compensating circuit 38 comprises two series circuits, one of which is connected in parallel circuit relationship with the load winding 14, and the other of which is connected in parallel circuit relationship with the load winding 20. These series circuits including their respective series connected load windings 14 and 20 are connected to be alternately energized by an auxiliary alternating-current supply voltage which is applied to terminals 40 and 42.

As will be explained more fully hereinafter, in order to obtain proper operation it is necessary that the magnitude of the auxiliary supply voltage, as applied to the terminals 40 and 42, be greater than the magnitude of the main supply voltage, as applied to the terminals 30 and 32. In operation, it is also necessary to so coordinate the main and auxiliary supply voltages that when the terminal 30 is at a positive polarity with respect to the terminal 32, the terminal 40 will likewise be at a positive polarity with respect to the terminal 42.

Once the magnetic core members 12 and 18 saturate, as will be described hereinafter, the impedance of the load windings 14 and 20 decrease to a very low value. Therefore, in order to limit the magnitude of the current flow through the load winding 14, as effected by the auxiliary supply voltage, when the magnetic core member 12 is saturated, an impedance member or resistor 44 is connected in the series circuit that is connected in parallel circuit relationship with the load winding 14. In like manner, in order to limit the magnitude of the current flow through the load winding 20, as effected by the auxiliary voltage, when the magnetic core member 18 is saturated, an impedance member or resistor 46 is included in the series circuit that is connected in parallel circuit relationship with the load winding 20. In practice, the impedance of the resistor 44 and the impedance of the resistor 46 should be larger than the impedance of the load 28 in order to secure proper operation. As will be explained more fully hereinafter, the resistors 44 and 46 likewise function to aid in obtaining a back-voltage across the self-saturating rectifiers 24 and 26, respectively.

In order to prevent current from flowing through the load winding 14 when the terminal 42 is at a positive polarity with respect to the terminal 40, an exciting-current rectifier 50 is also included in the series circuit that is connected in parallel circuit relationship with the load winding 14. In like manner, in order to prevent current from flowing through the load winding 20, when the terminal 40 is at a positive polarity with respect to the terminal 42, an exciting-current rectifier 52 is included in the series circuit that is connected in parallel circuit relationship with the load winding 20.

The operation of the magnetic amplifier 10 will now be described. When the terminal 40 is at a positive polarity with respect to the terminal 42 exciting current flows from the terminal 40 through the resistor 44, the exciting-current rectifier 50, and the load winding 14, to the terminal 42, to thereby develop a voltage across the load winding 14. The polarity of this voltage developed across the load winding 14 is in electrical opposition to the main supply voltage as applied to the terminals 30 and 32. As hereinbefore mentioned, the magnitude of the auxiliary supply voltage, as applied to the terminals 40 and 42 is greater than the magnitude of the main supply voltage, as applied to the terminals 30 and 32. In particular, the auxiliary supply voltage is of such magnitude as compared to the main supply voltage that in operation the voltage developed across the load winding 14 by the auxiliary supply voltage, when the core member 12 is in the unsaturated condition, is of greater magnitude than the main supply voltage. However, the voltage developed across the load winding 14 under such conditions is almost equal to the auxiliary supply voltage since when the core member 12 is unsaturated, the impedance of the load winding 14 is much greater than the sum of the impedance of the resistor 44 and the forward-impedance of the rectifier 50.

When the voltage developed across the load winding 14 is of greater magnitude than the main supply voltage, a back-voltage appears across the self-saturating rectifier 24. Under such conditions, the main supply voltage, as applied to the terminals 30 and 32, does not effect a flow of current through the load 28. However, the auxiliary supply voltage, as applied to the terminals 40 and 42, does effect a flow of exciting current through the resistor 44, the exciting-current rectifier 50 and the load winding 14. Specifically, the exciting current flows from the terminal 40 through the resistor 44, the exciting-current rectifier 50 and the load winding 14, to the terminal 42. It is to be noted, however, that this exciting current does not flow through the load 28 since the auxiliary supply voltage, as applied to the terminals 40 and 42, is electrically isolated from the load 28.

The flow of exciting current through the load winding 14 effects a substantially complete magnetic saturation of the magnetic core member 12. Once the magnetic core member 12 saturates, the impedance of the load winding 14 decreases to a very low value. Therefore, the voltage developed across the load winding 14, under such conditions, is extremely small and the voltage drop across the resistor 44 increases to a relatively large value. This results in a removal of the back-voltage across the self-saturating rectifier 24 and, therefore, the main supply voltage effects a flow of current through the load winding 14 and the load 28. In particular, the load current flows from the terminal 30 through the self-saturating rectifier 24, the load winding 14, and the load 28, to the terminal 32. When the magnetic core member 12 is saturated, current also flows from the terminal 40 through the resistor 44, the exciting-current rectifier 50, and the load winding 14, to the terminal 42. However, the magnitude of this latter current flow is relatively low since it is limited by the resistor 44.

When the terminal 30 is at a positive polarity with respect to the terminal 32, and when the terminal 40 is at a positive polarity with respect to the terminal 42, the self-saturating rectifier 26 and the exciting-current rectifier 52 function to prevent the flow of current through the load winding 20. However, during this half-cycle of the operation the current flow through the control winding 22 effects a resetting of the flux level in the magnetic core member 18. That is, the current flow through the control winding 22 drives the magnetic core member 18 away from saturation to a level as determined by the magnitude of the direct-current voltage applied to the control terminals 34 and 36.

During the next half-cycle of the operation, when the terminal 32 is at a positive polarity with respect to the terminal 30, and when the terminal 42 is at a positive polarity with respect to the terminal 40, exciting current flows from the terminal 42 through the load winding 20, the exciting-current rectifier 52, and the resistor 46, to the terminal 40. This current flow develops a voltage across the load winding 20, that is of greater magnitude than the main supply voltage, as applied to the terminals 30 and 32. Therefore, a back-voltage appears across the self-saturating rectifier 26. Under such conditions current does not flow through the load 28, however, the exciting current, as effected by the auxiliary supply voltage, does flow through the load winding 20, which current flow effects a substantially complete magnetic saturation of the magnetic core member 18.

Once the magnetic core member 18 saturates, the impedance of the load winding 20 decreases to a very low value. Therefore, the voltage developed across the load winding 20, when the magnetic core member 18 is saturated, is very low as compared to the voltage developed across the resistor 46. This results in the removal of the back-voltage across the self-saturating rectifier 26, and thus load current flows from the terminal 32 through the load 28, the load winding 20, and the self-saturating rectifier 26, to the terminal 30. When the terminal 42 is at positive polarity with respect to the terminal 40, current also flows from the terminal 42 through the load winding 20, the exciting-current rectifier 52 and the resistor 46, to the terminal 40. However, the magnitude of this latter current flow is rather small since it is limited by the resistor 46.

During the half-cycle of the operation when the terminal 32 is at a positive polarity with respect to the terminal 30, and when the terminal 42 is at a positive polarity with respect to the terminal 40, the self-saturating rectifier 24 and the exciting-current rectifier 50 function to prevent the flow of current through the load winding 14. This enables the current flow through the control winding 16 to drive the magnetic core member 12 away from saturation and thus reset the flux level in the core member 12. Then, during the next half-cycle of the operation when exciting current flows through the load winding 14, the magnetic core member 12 is again driven to saturation. Once this occurs, load current flows through the load winding 14 and the load 28, the magnitude of this current flow being determined by the flux level to which the magnetic core member 12 has been reset during the previous half-cycle of operation.

Figure 2:
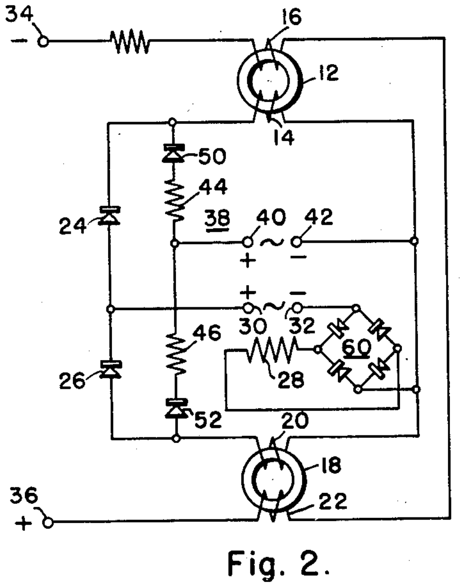
Fig. 2 is a schematic diagram of a direct-current output magnetic amplifier illustrating this invention.

Referring to Fig. 2 there is illustrated another embodiment of the teachings of this invention in which like components of Figs. 1 and 2 have been given the same reference characters. The main distinction between the apparatus of Figs. 1 and 2 is that in the apparatus of Fig. 2 a full-wave dry-type rectifier 60 is provided in order to secure direct-current voltage across the load 28. Specifically, one of the input terminals of the rectifier 60 is connected to the terminal 32 and the other input terminal of the rectifier 60 is connected to the junction point of the load windings 14 and 20. The load 28 is rendered responsive to the output of the rectifier 60 by connecting the load 28 to the output terminals of the rectifier 60. Since the operation of the apparatus of Fig. 2 is substantially identical to the operation of the appaartus of Fig. 1 except for the manner in which the current flows through the rectifier 60, a further description of such operation is deemed unnecessary.

Figure 3:
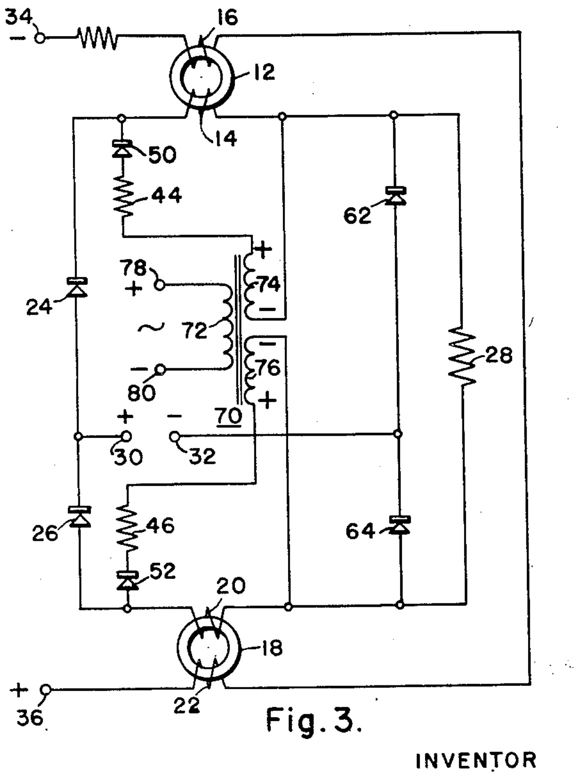
Fig. 3 is a schematic diagram of a bridge-type magnetic amplifier illustrating this invention.

Referring to Fig. 3 there is illustrated a bridge-type full-wave magnetic amplifier illustrating this invention and in which like components of Figs. 1 and 3 have been given the same reference characters. The main distinction between the apparatus of Figs. 1 and 3 is that in the apparatus of Fig. 3 additional apparatus has been added and the circuit rearranged in order to provide a bridge-type circuit. In particular, a load rectifier 62 is interconnected between the terminal 32 and one end of the load winding 14, and a load rectifier 64 is interconnected between one end of the load winding 20 and the terminal 32. As illustrated, the load 28 is connected across the series circuit including the load rectifiers 62 and 64.

In this instance, the auxiliary supply voltage is obtained from a potential transformer 70 having a primary winding 72 and two secondary winding sections 74 and 76. Specifically, the primary winding 72 is connected to terminals 78 and 80 which have applied thereto an auxiliary alternating-current supply voltage, and a measure of this auxiliary supply voltage appears across each of the secondary winding sections 74 and 76. In this instance, the secondary winding section 74 is connected in series circuit relationship with the resistor 44 and with the exciting-current rectifier 50, this series circuit being connected in parallel circuit relationship with the load winding 14. Thus, the series circuit including the resistor 44, the exciting-current rectifier 50, and the load winding 14 are connected to be energized by a measure of the auxiliary supply voltage as it appears across the secondary winding section 74. On the other hand, the secondary winding section 76 of the transformer 70 is connected in series circuit relationship with the resistor 46 and with the exciting-current rectifier 52. This latter series circuit is connected in parallel circuit relationship with the load winding 20. Thus, the series circuit including the resistor 46, the exciting-current rectifier 52, and the load winding 20 are connected to be energized by a measure of the auxiliary supply voltage as it appears across the secondary winding section 76, of the transformer 70.

In operation, when the terminal 30 is at a positive polarity with respect to the terminal 32, load current flows from the terminal 30 through the self-saturating rectifier 24, the load winding 14, the load 28 and the load rectifier 64, to the terminal 32. On the other hand, when the terminal 32 is at a positive polarity with respect to the terminal 30, load current flows from the terminal 32 through the load rectifier 62, the load 28, the load winding 20, and the self-saturating rectifier 26, to the terminal 30. Since the secondary winding sections 74 and 76 of the transformer 70 apply auxiliary supply voltage to the desired components in the same manner as it it applied by the terminals 40 and 42, of Figs. 1 and 2, a further description of the operation of the magnetic amplifier illustrated in Fig. 3 is deemed unnecessary. However, it is to be noted, that when the upper end of the secondary winding section 74, as illustrated, is at positive polarity with respect to its lower end, the lower end of the secondary winding section 76, as illustrated, is at a positive polarity with respect to its upper end.

Figure 4:
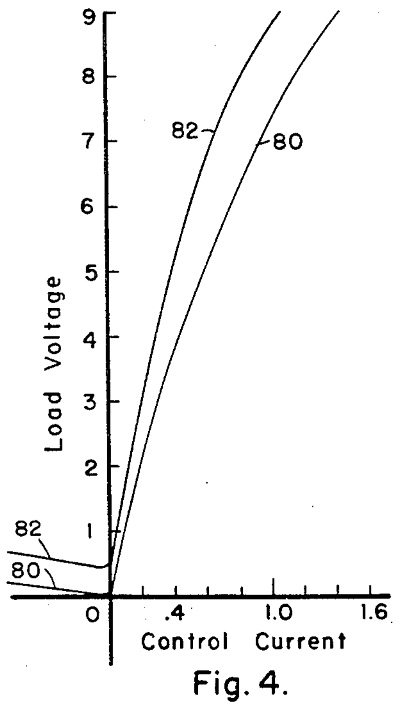
Fig. 4 is a graph, a curve of which illustrates the manner in which the output voltage of the magnetic amplifiers of Figs. 1 through 3 varies with changes in the magnitude of the input control signal.

Referring to Fig. 4 there is illustrated two curves 80 and 82 which represent the manner in which the output voltage of magnetic amplifier varies when this invention is and is not, respectively, incorporated therein. As can be seen from Fig. 4 the curve 80 starts at zero load voltage when the magnetic amplifier, such as the magnetic amplifier 10, is operating at cutoff. However, in the case of the curve 82, representing a magnetic amplifier not having exciting current compensation, the output of the magnetic amplifier is not of zero magnitude when operating at cutoff.

It is to be understood that in the magnetic amplifier of Fig. 3 the resistors 44 and 46 may appear as an equivalent impedance in the primary circuit of the transformer 70. That is, an impedance (not shown) could be connected in series circuit relationship with the primary winding 72.

The apparatus embodying the teachings of this invention has several advantages. For instance, there is no need to provide an expensive dummy reactor in order to accomplish the desired compensation. In addition, the apparatus embodying the teachings of this invention has high accuracy from the standpoint of obtaining zero load voltage when the magnetic amplifier is operating at cutoff. Further, the gain of the magnetic amplifier is not seriously impaired when utilizing the compensating circuit embodying the teachings of this invention.

Since certain changes may be made in the above apparatus and circuits and different embodiments of the invention could be made without departing from the scope thereof, it is intended that all matter contained in the above description or shown in the accompanying drawing shall be interpreted as illustrative and not in a liimting sense.

I claim as my invention:

1. In a magnetic amplifier for supplying energy to a load, the combination comprising, a magnetic core member, a winding disposed in inductive relationship with the tionship with one another, said circuit being connected the load, the rectifier, and the winding in circuit relationship with one another, said circuit being connected to be energized by a main supply voltage, and a compensating circuit, the compensating circuit and the winding being energized by an auxiliary supply voltage, the auxiliary supply voltage being of greater magnitude than the main supply voltage, and the compensating circuit being so interconnected with the load, the rectifier, and with the winding that a back-voltage appears across the rectifier to thereby prevent exciting current from flowing through the load while the auxiliary supply voltage is effecting a substantially complete magnetic saturation of the magnetic core member.

2. In a self-saturating magnetic amplifier for supplying energy to a load, the combination comprising, a magnetic core member, a load winding disposed in inductive relationship with the magnetic core member, a self-saturating rectifier, means for connecting the load, the self-saturating rectifier, and the load winding in circuit relationship, said circuit being connected to be energized by a main supply voltage, a compensating circuit, the compensating circuit and the load winding being connected to be energized by an auxiliary supply voltage, the auxiliary supply voltage being of greater magnitude than the main supply voltage, and the compensating circuit being so interconnected with the load, the self-saturating rectifier, and with the load winding that a back-voltage appears across the self-saturating rectifier to thereby prevent exciting current from flowing through the load while the auxiliary supply voltage is effecting a substantially complete magnetic saturation of the magnetic core member, and a control winding disposed in inductive relationship with the magnetic core member, the control winding being responsive to a control voltage to thus effect a resetting of the flux level in the magnetic core member.

3. In a self-saturating magnetic amplifier for supplying energy to a load, the combination comprising, a magnetic core member, a load winding disposed in inductive relationship with the magnetic core member, a self-saturating rectifier, means for connecting the load, the self-saturating rectifier and the load winding in series circuit relationship with one another, the series circuit being connected to be energized by a main supply voltage, another series circuit, said another series circuit being connected in parallel circuit relationship with the load winding, the load winding and the said another series circuit being connected to be energized by an auxiliary supply voltage, and the magnitude of the main supply voltage being less than the magnitude of the voltage developed across the load winding by the auxiliary supply voltage when the magnetic core member is unsaturated, to thereby effect a back-voltage across the self-saturating rectifier while the auxiliary supply voltage effects a substantially complete magnetic saturation of the magnetic core member, to thereby prevent exciting current from flowing through the load, a control winding disposed in inductive relationship with the magnetic core member, and circuit means for rendering the control winding responsive to a control voltage whereby the flux level in the magnetic core member is reset when the load winding is deenergized.

4. In a self-saturating magnetic amplifier for supplying energy to a load, the combination comprising, a magnetic core member, a load winding disposed in inductive relationship with the magnetic core member, a self-saturating rectifier, means for connecting the load, the self-saturating rectifier, and the load winding in series circuit relationship with one another, the series circuit being connected to be energized by a main supply voltage, another series circuit including an impedance member, said impedance member having a larger impedance value than the load, said another series circuit being connected in parallel circuit relationship with the load winding, the load winding and the said another series circuit being connected to be energized by an auxiliary supply voltage, the magnitude of the main supply voltage being less than the magnitude of the voltage developed across the load-winding by the auxiliary supply voltage when the magnetic core member is unsaturated, to thereby effect a back-voltage across the self-saturating rectifier while the auxiliary supply voltage effects a substantially complete magnetic saturation of the magnetic core member, to thereby prevent exciting current from flowing through the load, a control winding disposed in inductive relationship with the magnetic core member, and circuit means for rendering the control winding responsive to a control voltage whereby the flux level in the magnetic core member is reset when the load winding is deenergized.

5. In a self-saturating magnetic amplifier for supplying energy to a load, the combination comprising, a magnetic core member, a load winding disposed in inductive relationship with the magnetic core member, a self-saturating rectifier, means for connecting the load, the self-saturating rectifier, and the load winding in series circuit relationship with one another, the series circuit being connected to be energized by a main supply voltage, another series circuit including an impedance member and an exciting-current rectifier, said impedance member having a larger impedance value than the load, said another series circuit being connected in parallel circuit relationship with the load winding, the load winding and the said another series circuit being connected to be energized by an auxiliary supply voltage, the magnitude of the main supply voltage being less than the magnitude of the voltage developed across the load winding by the auxiliary supply voltage when the magnetic core member is unsaturated, to thereby effect a back-voltage across the self-saturating rectifier while the auxiliary supply voltage effects a substantially complete magnetic saturation of the magnetic core member, to thereby prevent exciting current from flowing through the load, a control winding disposed in inductive relationship with the magnetic core member, and circuit means for rendering the control winding responsive to a control voltage whereby the flux level in the magnetic core member is reset when the load winding is deenergized.

6. In a full-wave magnetic amplifier for supplying energy to a load, the combination comprising, magnetic core means, two load windings disposed in inductive relationship with the magnetic core means, a rectifier connected in series circuit relationship with each of the load windings, each of the series circuits being connected in circuit relationship with the load and connected to be energized by a main supply voltage, and a compensating circuit, the compensating circuit and the two load windings being connected to be energized by an auxiliary supply voltage, the auxiliary supply voltage being of greater magnitude than the main supply voltage, and the compensating circuit being so interconnected with the load and with each of said series circuits that a back-voltage alternately appears across each of the rectifiers of the said series circuits, to thereby prevent exciting current from flowing through the load.

7. In a full-wave magnetic amplifier for supplying energy to a load, the combination comprising, magnetic core means, two load windings disposed in inductive relationship with the magnetic core means, a self-saturating rectifier connected in series circuit relationship with each of the load windings, each of the series circuits being connected in circuit relationship with the load and connected to be energized by a main supply voltage, a compensating circuit, the compensating circuit and the two load windings being connected to be energized by an auxiliary supply voltage, the auxiliary supply voltage being of greater magnitude than the main supply voltage, and the compensating circuit being so interconnected with the load and with each of said series circuits that a back-voltage alternately appears across the self-saturating rectifiers of the said series circuits, to thereby prevent exciting current from flowing through the load, and a control winding disposed in inductive relationship with the magnetic core means, the control winding being responsive to a control voltage so as to reset the flux level in the magnetic core means.

8. In a full-wave magnetic amplifier for supplying energy to a load, the combination comprising, magnetic core means, two load windings disposed in inductive relationship with the magnetic core means, a self-saturating rectifier connected in series circuit relationship with each of the load windings, each of the series circuits being connected in circuit relationship with the load and connected to be energized by a main alternating-current supply voltage, another series circuit, including impedance means, connected in parallel circuit relationship with one of the two load windings, a further series circuit, including other impedance means, connected in parallel circuit relationship with the other of the two load windings, the two load windings, said another series circuit and said further series circuit being connected to be energized by an auxiliary alternating-current supply voltage, the auxiliary alternating-current supply voltage being of greater magnitude than the main alternating-current supply voltage, to thereby provide a back-voltage across one of the self-saturating rectifiers during alternate half-cycles of the main and auxiliary alternating-current supply voltages, and provide a back-voltage across the other self-saturating rectifier during the other alternate half-cycles of the main and auxiliary alternating-current supply voltages, to thus prevent the flow of exciting current through the load.

9. In a full-wave magnetic amplifier for supplying energy to a load, the combination comprising, magnetic core means, two load windings disposed in inductive relationship with the magnetic core means, a self-saturating rectifier connected in series circuit relationship with each of the load windings, each of the series circuits being connected in circuit relationship with the load and connected to be energized by a main alternating-current supply voltage, another series circuit, including impedance means and an exciting-current rectifier, connected in parallel circuit relationship with one of the two load windings, a further series circuit, including other impedance means and another exciting-current rectifier, connected in parallel circuit relationship with the other of the two load windings, the two load windings, said another series circuit and said further series circuit being connected to be energized by an auxiliary alternating-current supply voltage, the auxiliary alternating-current supply voltage being of greater magnitude than the main alternating-current supply voltage, to thereby provide a back-voltage across one of the self-saturating rectifiers during alternate half-cycles of the main and auxiliary alternating-current supply voltages, to thus prevent the flow of exciting current through the load.

References Cited in the file of this patent

UNITED STATES PATENTS 2,571,708 Graves ________________ Oct. 16, 1951